March 9, 1943.    R. A. GOEPFRICH    2,313,430
BRAKE CONTROL MECHANISM
Original Filed Oct. 1, 1937    2 Sheets-Sheet 1

INVENTOR.
RUDOLPH A. GOEPFRICH
BY
M.W. McConkey
ATTORNEY.

Patented Mar. 9, 1943

2,313,430

UNITED STATES PATENT OFFICE 2,313,430

BRAKE CONTROL MECHANISM

Rudolph A. Goepfrich, South Bend, Ind., assignor, by mesne assignments, to Bendix Aviation Corporation, South Bend, Ind., a corporation of Delaware Original application October 1, 1937, Serial No. 166,737. Divided and this application April 3, 1940, Serial No. 327,555

8 Claims. (Cl. 192—3)

This invention relates in general to the braking mechanism of automotive vehicles and in particular to means for controlling such mechanism commonly known to those skilled in the art as a "no-back" or "no-roll" device. With such mechanism, once the brakes are applied when the vehicle is at a standstill or in motion at a predetermined low speed the brakes usually remain applied until the operator again desires to place the vehicle in motion. The present application is a division of my copending application, Serial No. 166,737, filed October 1, 1937, now Patent No. 2,197,721, dated April 16, 1940.

An object of this invention is to provide a no-back mechanism in combination with the braking system and the engine control mechanism of a vehicle.

A second object of my invention is to provide means for retaining the brakes of a vehicle applied so long as the accelerator remains released and the vehicle is not traveling above a certain speed.

A third object is to provide a no-back mechanism, the operation of which is contingent upon the cooperation of two factors—slowing of the vehicle below a certain predetermined speed and release of the accelerator.

A further object of my invention is to furnish a novel control valve for actuating the no-back mechanism.

Figure 1:
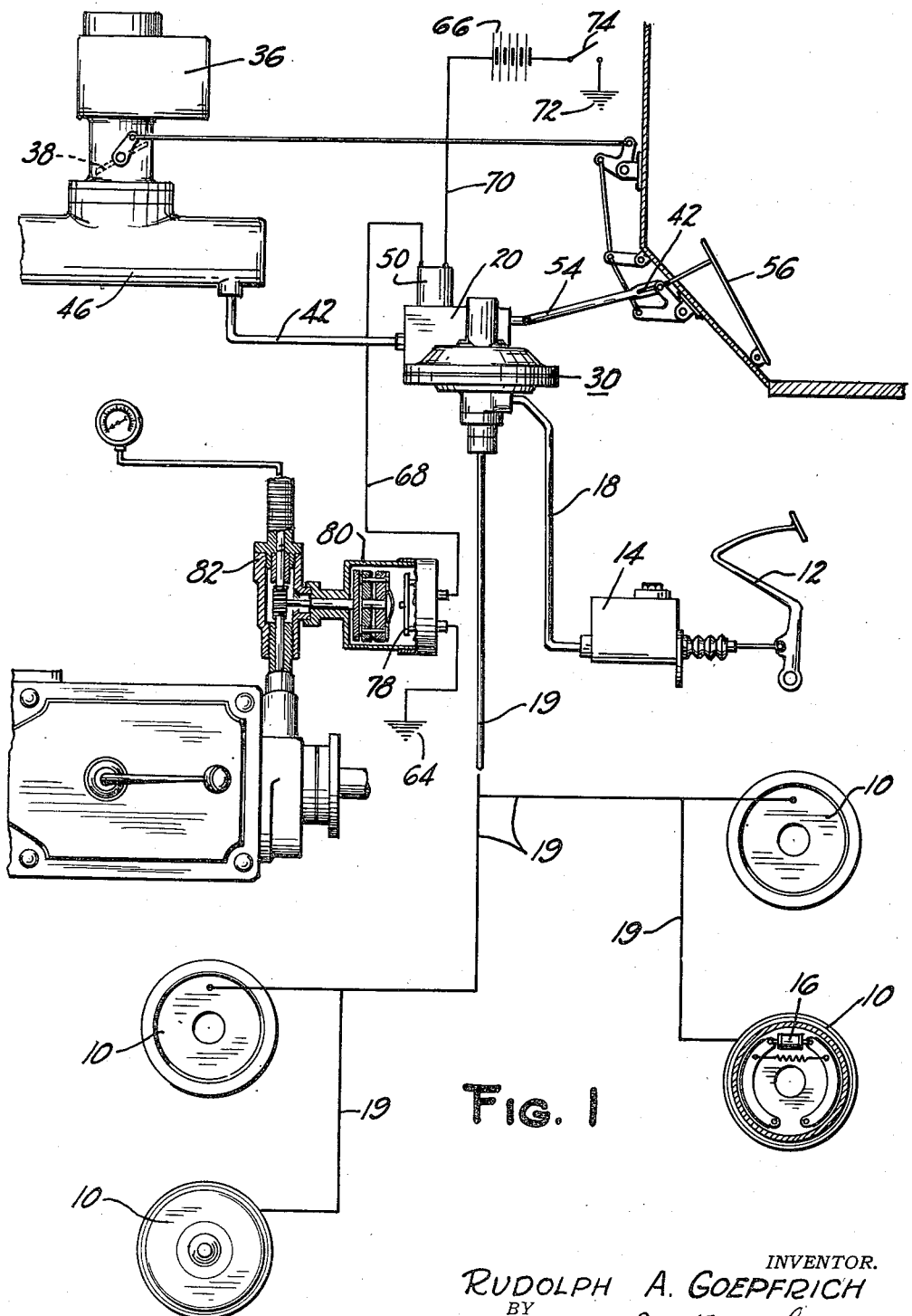
Figure 2:
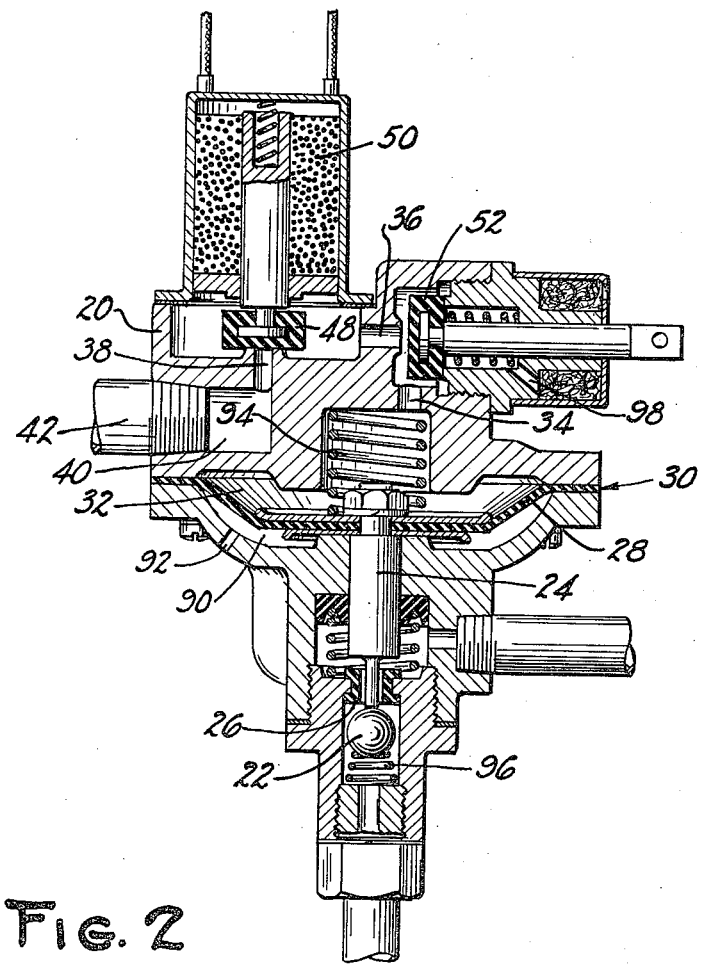

Other objects of the invention and desirable details of construction and combinations of parts will become apparent from the following detailed description of a certain embodiment of the invention, taken in conjunction with the accompanying drawings illustrating the said embodiment, in which:

Figure 1 is a diagrammatic view disclosing the principal elements of the brake controlling mechanism constituting my invention; and Figure 2 is a vertical section disclosing in detail the no-back device of the brake control mechanism disclosed in Figure 1.

In the embodiment of my invention disclosed in Figure 1, conventional two-shoe wheel brakes 10 are operated by a hydraulic mechanism of conventional design, including a manually operable brake pedal 12 operably connected to a so-called master cylinder 14, the latter being placed in fluid transmitting connection with brake shoe operating wheel cylinders 16 by means of conduits 18 and 19.

The invention disclosed in Figure 1 is directed to a so-called no-back mechanism for insuring continued application of the brakes, once applied, after the accelerator of the vehicle is released and while the speed of the vehicle is at or below a predetermined factor. The no-back mechanism is housed as a unit by a casing 20 and, as disclosed in detail in Figure 2, comprises a spring loaded ball check valve 22 adapted, when a bayonet plunger 24 is moved upwardly, to seat at 26. The plunger 24 is moved to this position by means of a diaphragm 28 of a pressure differential operated motor 30, the upper chamber 32 of the motor being connected, via ports 34, 36, 38 and 40 and conduit 42, with the intake manifold 46 of the internal combustion engine of the vehicle.

There is thus provided a source of vacuum to energize the check valve operating motor 30. The motor is controlled by two valves, including a two-way cut-out valve 48 operated by a solenoid 50 and a three-way valve 52 operated, through the intermediary of a link 54, by the engine controlling accelerator 56 of the vehicle.

The solenoid 50 is in part controlled by means of a switch 78 operated by a governor 80, the latter being operated by the speedometer drive 82. The switch 78 is grounded at 64, and a wire 68 connects one terminal of the switch 78 to a terminal of the solenoid 50. The other terminal of the solenoid is connected by a wire 70 to a battery 66 which is grounded at 72. Intermediate the battery and the ground 72 is a switch 74, which allows the operator of the vehicle to render the no-back mechanism ineffective at any desired time.

Describing now the operation of the no-back mechanism, upon release of the accelerator 56, the three-way valve 52 is actuated to in part open up the fluid transmitting connection between the motor 30 and the intake manifold 46. Assuming the switch 74 to be closed, closing of the switch 78 when the speed of the vehicle is at or below a predetermined factor, will complete the electric circuit, thus energizing the solenoid 50 to open the cut-out valve 48. The motor 30 is thus energized by partially evacuating the chamber 32, the atmosphere, vented to a chamber 90 by means of port 92, serving to move the diaphragm 28 upwardly against the action of a return spring 94 to permit a spring 96 to seat the ball check valve 22. Should the brake now be applied by means of the pedal 12, the brake, by virtue of the action of the check valve, will remain applied until the motor 30 is deenergized by depressing the accelerator to close the three-way valve 52. By this action, the chamber 32 is vented to the atmosphere via a port 98 of the three-way valve.

There is thus provided a means automatically operative to hold the car in fixed position, once brought to a standstill, so long as the accelerator remains in its released position and the engine is idling to provide a source of vacuum to energize the motor 30. After stopping the car on an incline, the driver may remove his right foot from the brake pedal and transfer it to the accelerator to again place the car in motion, without the risk of having the car move backwardly.

Although this invention has been described in connection with a certain specific embodiment, the principles involved are susceptible of numerous other applications that will readily occur to persons skilled in the art. The invention is, therefore, to be limited only as indicated by the scope of the appended claims.

I claim:

1. In a vehicle having brakes, an accelerator, and speed indicating means, a brake control system comprising brake applying means, means for holding the brakes applied, means associated with the accelerator for rendering said holding means ineffective, and means including an electric switch associated with said speed indicating means for rendering said holding means ineffective.

2. In a vehicle having brakes, an accelerator, and speed indicating means, a brake control system comprising brake applying means, means for holding the brakes applied, means associated with the accelerator for rendering said holding means ineffective whenever the accelerator is actuated, and means including an electric switch associated with said speed indicating means for rendering said holding means ineffective whenever the speed of the vehicle is higher than a certain predetermined amount.

3. In an automotive vehicle provided with an accelerator, brakes and a speedometer, means for operating the brakes, means including an electric switch operated by the speedometer for in part controlling the operation of the brakes, and means operated by the accelerator for in part controlling the operation of the brakes.

4. In a vehicle having brakes, means for applying said brakes, means for holding said brakes applied, electro-pneumatic means for controlling said holding means, accelerator-controlled means for in part governing the electro-pneumatic means, and a switch responsive to the speed of the vehicle for in part governing the electro-pneumatic means.

5. In a vehicle having hydraulic brakes, means for supplying pressure fluid to said brakes, means for trapping said pressure fluid to hold the brakes applied, electro-pneumatic means for controlling said trapping means, accelerator-controlled means for in part governing the electro-pneumatic means, and a switch responsive to the speed of the vehicle for in part governing the electro-pneumatic means.

6. In a vehicle having hydraulic brakes, means for supplying pressure fluid to said brakes, a valve for trapping said pressure fluid to hold the brakes applied, electro-pneumatic means for controlling said valve, accelerator-controlled means for in part governing the electro-pneumatic means, and a switch responsive to the speed of the vehicle for in part governing the electro-pneumatic means.

7. In combination, brakes, hydraulic means for applying said brakes, electro-pneumatic means for at times holding the brakes applied, and a plurality of switches in series for controlling the electro-pneumatic means.

8. In a vehicle having brakes, hydraulic means for applying said brakes, electro-pneumatic means for at times holding the brakes applied, accelerator-controlled means for in part governing the electro-pneumatic means, a switch responsive to the speed of the vehicle for in part governing the electro-pneumatic means, and a separate switch for at times preventing the electro-pneumatic means from holding the brakes applied.

RUDOLPH A. GOEPFRICH.